United States Patent [19]

Magid et al.

[11] Patent Number: 5,764,873
[45] Date of Patent: Jun. 9, 1998

[54] LAZY DRAG OF GRAPHICAL USER INTERFACE (GUI) OBJECTS

[75] Inventors: Peter G. Magid, Boca Raton, Fla.; Richard E. Berry, Georgetown, Tex.

[73] Assignee: International Business Machines Corporation, Armonk, N.Y.

[21] Appl. No.: 227,813

[22] Filed: Apr. 14, 1994

[51] Int. Cl.[6] ............................................. G06F 3/00
[52] U.S. Cl. ....................... 395/339; 395/346; 395/348
[58] Field of Search ........................................ 395/155–161

[56] References Cited

U.S. PATENT DOCUMENTS

| | | | |
|---|---|---|---|
| 4,772,882 | 9/1988 | Mical | 340/709 |
| 5,050,105 | 9/1991 | Peters | 364/521 |
| 5,157,763 | 10/1992 | Peters et al. | 395/157 |
| 5,196,838 | 3/1993 | Meier et al. | 340/724 |
| 5,239,287 | 8/1993 | Siio et al. | 340/706 |
| 5,245,321 | 9/1993 | Franz et al. | 345/172 |
| 5,367,623 | 11/1994 | Iwai et al. | 395/157 |
| 5,404,442 | 4/1995 | Foster et al. | 395/159 |
| 5,416,901 | 5/1995 | Torres | 395/159 |
| 5,469,540 | 11/1995 | Powers, III et al. | 395/158 |

OTHER PUBLICATIONS

Poor, A., "Trackballs: Stationary Mice", PC Magzine, v6, N.14, p. 199(4), 1987.

Terdman, S., "Mice and Trackballs in Mice & . . . ." PC Magazine, V.9, No. 14, 1990, p. 227(1).

*Primary Examiner*—Raymond J. Bayerl
*Assistant Examiner*—A. Katbab
*Attorney, Agent, or Firm*—Mark S. Walker; Andrew J. Dillon

[57] ABSTRACT

A computer system employs a graphical user interface and pointing device to allow a user to drag icons, representing data or objects, without holding the mouse button, or other key, actively depressed. The system allows the user to select and add icons, from a displayed window, to a "drag set". Multiple "drag sets" are linked to a "lazy drag" set, the contents of which may be moved to a target location. At the target location, the user decides what operation is to be performed with the data or objects linked to the "lazy drag" set.

14 Claims, 6 Drawing Sheets

LAZY DRAG OF GRAPHICAL USER INTERFACE (GUI) OBJECTS

BACKGROUND OF THE INVENTION

1. Field of the Invention

The subject invention generally relates to manipulating icons or symbols representing data or objects within and/or between active computer applications and, more particularly, assisting operators in performing such manipulations without requiring an operator to hold any key actively depressed during the manipulation; or requiring an operator to decide, in advance, the function to be performed on the object to be manipulated.

2. Description of Related Art

The need to transfer information within and/or between active computer application programs has grown in importance with the development of the capability to simultaneously display and access multiple files and application programs on a single computer screen through the use of windows or viewports. Each application displayed within a window can be initiated, accessed, changed, saved, closed and exited independently of events occurring within other concurrently displayed windows. The operator may thereby view and manipulate sources without the inconvenience and loss of time involved in closing and exiting one application in order to access another.

It has therefore become necessary to design what have become known in the art as "user friendly" input devices and computer programs. Such "user friendly" devices and software are designed to allow an unsophisticated user to perform desired tasks without extensive training. One of the more popular input devices is the mouse pointing device. The mouse generates signals corresponding to the direction and distance it is moved across a flat surface by the user. The computer responds to this information by changing the position of the cursor on the computer display to allow the user to point to any displayed object. Once the cursor is correctly positioned, the user can perform a number of functions by depressing one or more buttons on top of the mouse.

Certain operating environments or applications manipulate objects on a basic level by allowing the operator to position a mouse controlled cursor at a displayed object and to move the selected object by first dynamically pressing and holding a button on the mouse, or other pointing device. The button on the mouse button is actively held while the selected object is manipulated or "dragged" within or between applications.

A shortcoming of the basic "drag" manipulation of a selected object or data arises during intervening steps that may arise between selecting the object to be dragged and dropping the selected object at a target point. The operator may prematurely release the mouse button before arriving at, or otherwise identifying, the target point. Moreover, it may be desirable for the operator to perform intermediate steps between selecting and dropping the selected object. For example, U.S. Pat. No. 5,196,838 to Meier et. al. provides the operator with an intelligent scrolling capability. The intelligent scrolling feature allows the operator to scroll in a window by moving the cursor along with the selected object, while holding the mouse button actively depressed, to a scrolling area. Having maintained the cursor in the scrolling area for a predetermined period of time, the contents of the window are accordingly scrolled. A shortcoming of intelligent scrolling is that the operator must nevertheless both hold the mouse button actively depressed and position the cursor in the scroll area.

While transferring information within and/or between multiple, simultaneously active application programs, various possibilities exist. The desired transfer of information can be accomplished by first initiating a "cut" operation followed by a "paste" operation which involves deleting the data from one location or application and writing that data into another location or application. As an alternative, the desired transfer of information can be accomplished by first initiating a "copy" operation followed by a "paste" operation which involves copying the data from one location or application and writing that data into another location or application.

With the "cut and paste" or "copy and paste" operations, a transient data storage buffer area, known as a "clipboard", may be used to temporarily store data, manually marked as either "cut" or "paste", from one window of the display screen until it is pasted into a location in another window specified by positioning of the screen cursor at a point within the latter window. Details of such an application are discussed in two books entitled "Microsoft Windows Operators Guide" and "Microsoft Windows Operating Environment" which are both available from Microsoft Corporation, Bellevue, Wash. Although the "clipboard" type of "cut and paste" or "copy and paste" operation accomplishes the end goal of transferring information between concurrently active applications, it does so without providing the operator subsequent flexibility and in a manner which is not particularly operator friendly. For example, once data has been marked and stored on the "clipboard", the nature of the operation cannot be changed without re-marking the data to be cut or copied. The absence of a flexible and friendly operator interface diminishes the value of existing methods of cutting and pasting data both within and between applications.

SUMMARY OF THE INVENTION

According to the invention, a method and apparatus are provided allowing the operator to manipulate objects, graphically displayed on a computer display, during the process of positioning objects within or between files within a program or between different programs which are simultaneously active and concurrently viewable in the same or different windows or areas of the computer display. An operator desiring to manipulate data begins the operation by positioning the cursor at a selected one of the displayed objects. The operator is enabled to statically mark all or part of the object appearing on the computer display, by performing a first action in the computer system, as linked to a "lazy drag" operation. The "lazy drag" operation is defined as an operation enabling the operator of the computer system to manipulate an image of the statically marked object without requiring the operator to hold any key in the computer system actively depressed during the manipulation. The statically marked object may be moved to any other location on the computer display screen either within the same window or in any other window. After the statically marked object is properly positioned in its new location, the operator continues the positioning by performing a second action in the computer system, to cause a copy of the statically marked object to be formed at the target point. It is to be assumed that all operator commands, selections and options may be implemented through one or a combination of input devices such as a keyboard, mouse or similar device.

BRIEF DESCRIPTION OF THE DRAWING(S)

The subject matter which is regarded as the invention is particularly pointed out and distinctly claimed in the concluding portion of the specification. The invention, however, both as to organization and method of practice, together with further objects and advantages thereof, may be best understood by reference to the following description taken in conjunction with the accompanying drawing figures.

DESCRIPTION OF THE ILLUSTRATIVE EMBODIMENT(S)

The following detailed description is of the best presently contemplated mode for carrying out the invention. This description is not to be taken in a limiting sense but is made merely for the purpose of illustrating the general principles of the invention since the scope of the invention is best defined by the appending claims.

The invention may be run on a variety of computers under a number of different operating systems. The computer could be, for example, a personal computer, a mini computer, or a main frame computer. The computer may be a standalone system, part of a network such as a local area network or wide area network or a larger teleprocessing system. For purposes of illustration only, the invention is described as implemented on a personal computer, such as IBM's PS/2® computer series, although the specific choice of computer is limited only by memory and disk requirements.

Figure 1:
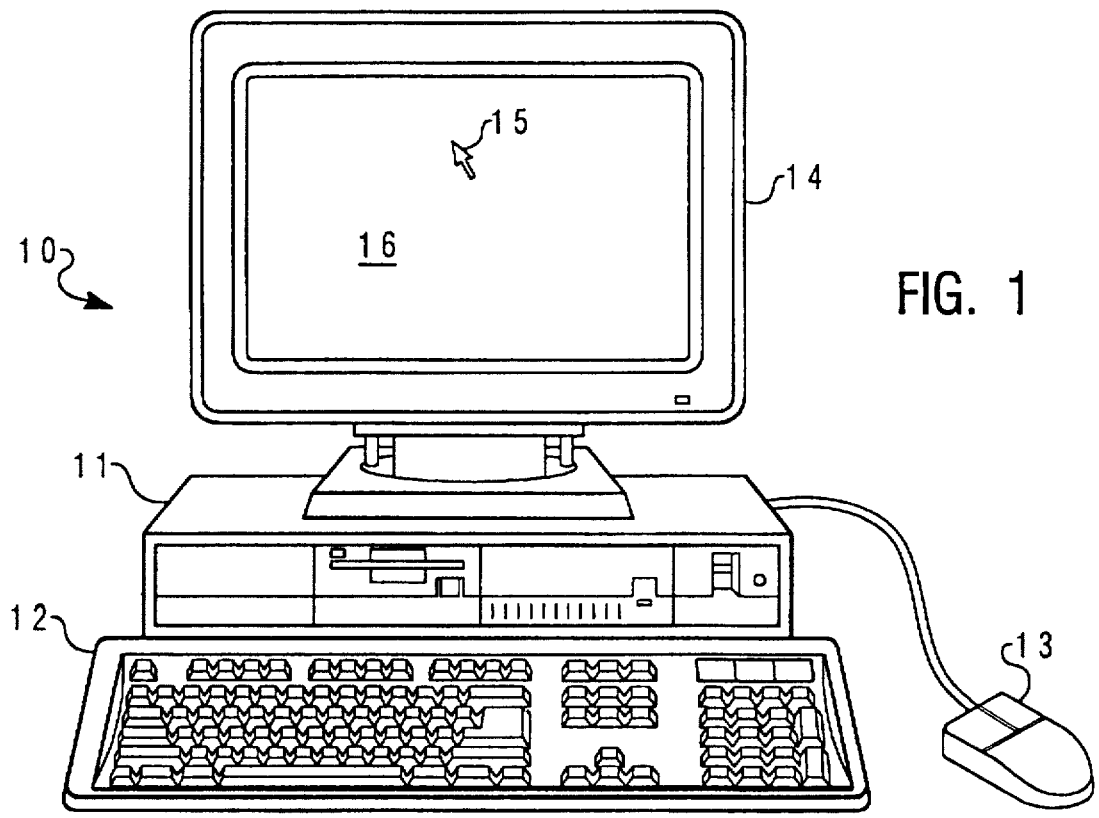
FIG. 1 shows a personal computer comprising system unit, keyboard, mouse and display.

Referring now to the drawings, and more particularly to FIG. 1, there is shown a personal computer system 10, comprising a system unit 11, a keyboard 12, a mouse 13 and a graphics display device or monitor 14. The keyboard 12 and the mouse 13 constitute user input devices, and the display device 14 is a user output device. The mouse 13 is used to control a cursor 15 displayed on the screen 16 of the display device 14. The graphical user interface (GUI) supported by this system allows the user to "drag" an object by moving the pointer or cursor 15 to an icon representing the object at a specific location on the screen 16 and then pressing one of the mouse buttons to perform a user command or selection. Those skilled in the art understand that pointing devices such as a touch sensor, graphic tablet, trackball or joystick could alternatively be used to manipulate the pointer across the graphical user interface.

Figure 2:
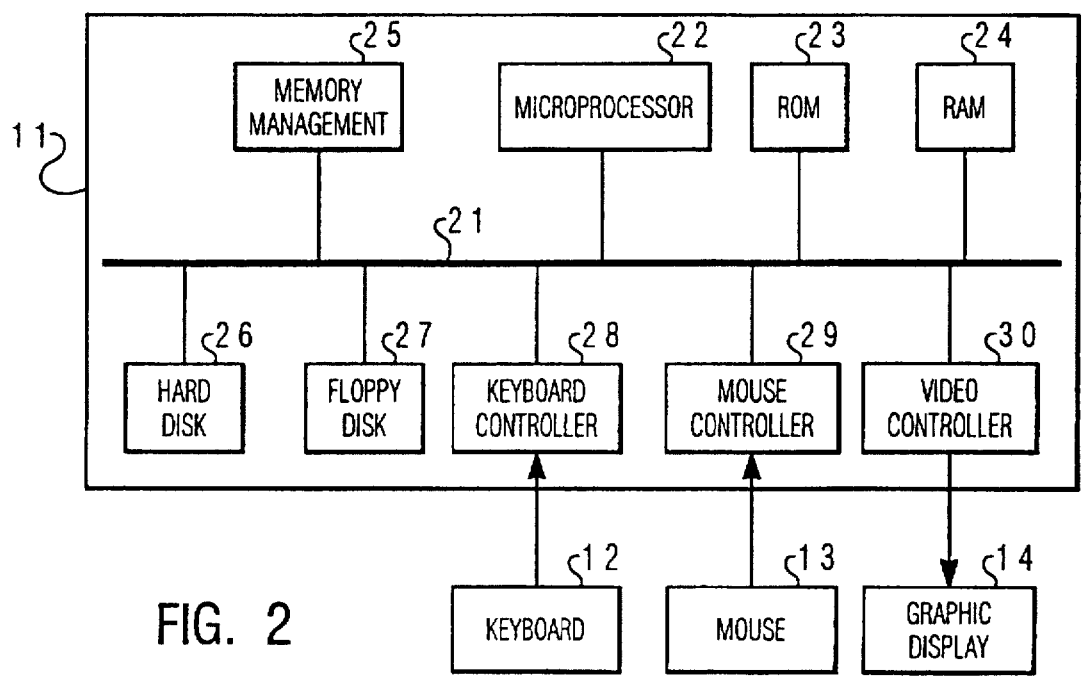
FIG. 2 is a block diagram of the components of the personal computer shown in FIG. 1.

FIG. 2 shows in block diagram form the components of the personal computer shown in FIG. 1. The system unit 11 includes a system bus 21 to which the various components are attached and by which communication between the various components is accomplished. A microprocessor 22 is connected to the system bus 21 and is supported by read only memory (ROM) 23 and random access memory (RAM) 24, also connected to system bus 21. The microprocessor 22 in the IBM PS/2 series of computers is one of the Intel family of microprocessors including the 80286, 80386 or 80486 microprocessors, but other microprocessors including, but not limited to, Motorola's family of microprocessors such as the 68000, 68020 or 68030 microprocessors and various RISC (Reduced Instruction Set Computer) microprocessors manufactures by IBM, Hewlett-Packard, Sun Microsystems, Intel, Motorola and others may be used in a specific computer.

The ROM 23 contains, among other code, the Basic Input/Output System (BIOS) which controls basic hardware operations, such as interactions of the disk drives and the keyboard. The RAM 24 is the main memory into which the operating system, data files and application programs are loaded. A memory management chip 25 is connected to the system bus 21 and controls Direct Memory Access (DMA) operations, including paging data between RAM 24 and a hard disk drive 26 and a floppy disk drive 27.

To complete the description of the system unit 11, there are three I/O controllers. These are the keyboard controller 28, the mouse controller 29 and the video controller 30, all of which are connected to the system bus 21. As there names imply, the keyboard controller 28 provides the hardware interface for the keyboard 12, the mouse controller 29 hardware interface for the mouse 13, and the video controller 30 provides the hardware interface for the graphic display device 14.

The hardware illustrated in FIGS. 1 and 2 is typical but may vary for a specific application; that is, there may be other peripherals, such as optical storage media, audio I/O, printers and the like. The invention is specifically directed to an enhancement to the operating system which controls or "runs" the hardware. The invention may be added to an existing operating system or it may provide the basis of an entirely new operating system, preferably the operating system supports a graphical user interface.

In an object oriented graphical user interface, data is encapsulated as a plurality of one or more objects. Further, applications or processes which manipulate data, physical devices, or folders comprising other objects can also be defined as objects. Each object is constrained in its behavior by certain rules which apply for that object or class of objects. It is convenient to represent the objects as pictorial symbols or icons. An icon serves as a readily identifiable face to the user to recognize the data or process which he wishes to manipulate. Objects can be represented in a nongraphical manner, e.g., as a cryptic text string, but with a concomitant loss in usability. Human factors studies have shown that a user will find it much easier to "grab" a document icon and "drag" it to the printer icon to have it printed, than to issue a cryptic print command for an equally cryptic file name.

Figure 3:
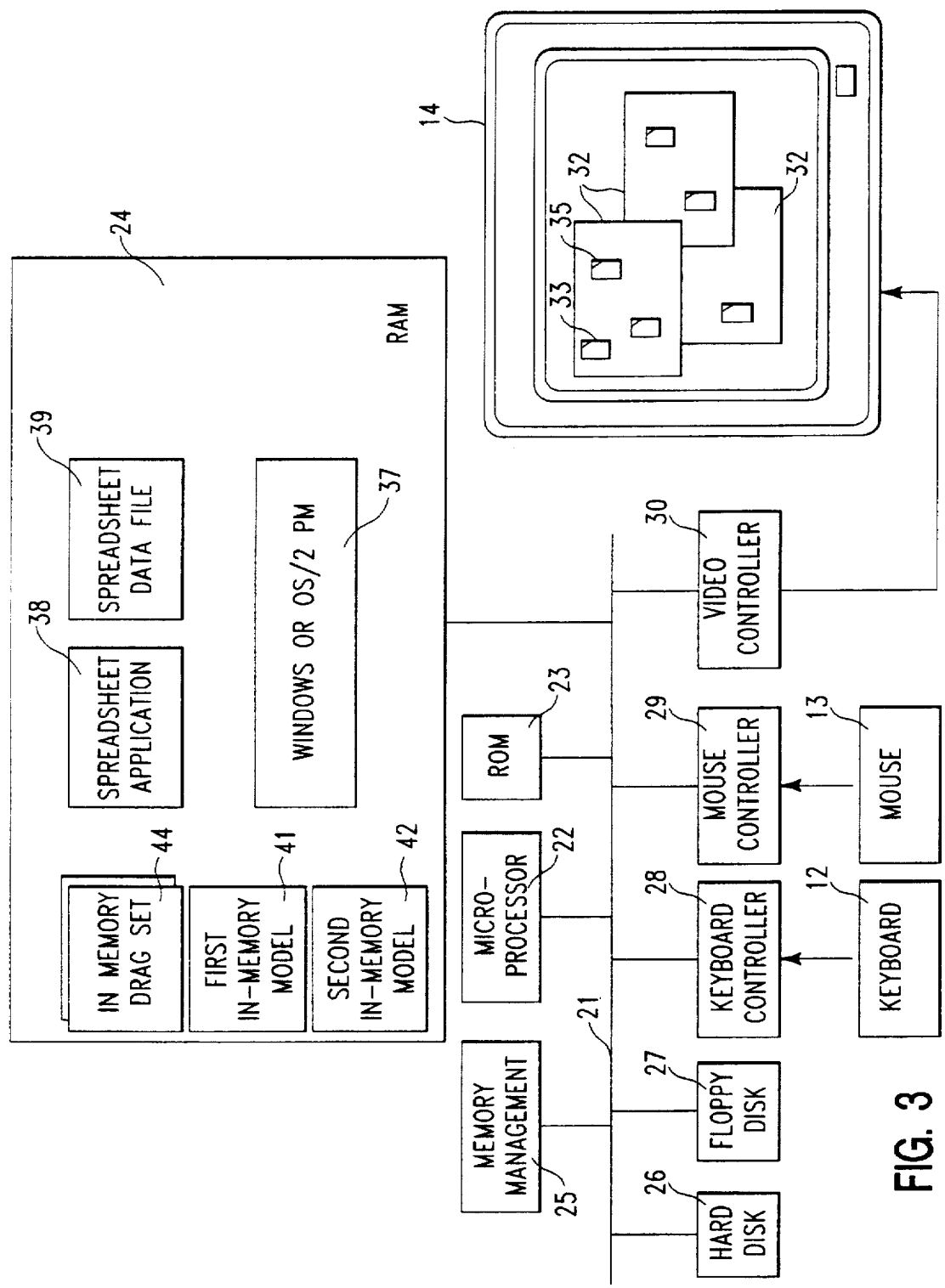
FIG. 3 shows a computer system equipped with a graphical user interface in which objects, represented as separate icons, are displayed in various windows.

The manner in which objects are displayed and handled in a GUI will differ from operating system to operating system. One possible embodiment is illustrated in FIG. 3. Objects within the GUI are each displayed within a window or a folder (recalling that a folder itself comprises other objects) which has been "opened". The GUI presented on system display 14 depicts one or more windows 32 or open folders; along with data files, applications which manipulate the data files, physical devices, or other folders, each as separate icons. Thus, as in FIG. 3 for example, a spreadsheet file icon 33 and a spreadsheet application icon 35 are presented in the GUI.

The RAM 24 may contain, among other code, an operating system 37, a spreadsheet application 38, a spreadsheet data file 39, a first in-memory model 41 for storing attributes associated with various objects available in the GUI, and a second in-memory model 42 for storing and keeping track of the location of the various objects. The first in-memory model 41 comprises object specific information for each object comprising, for example, picture or icon information, title, and the physical storage location for the information represented by the object. The second in-memory model 42 comprises x-y coordinate data for views of various objects within each window or folder within the GUI.

When the user elects to open the spreadsheet file icon 33, he moves the mouse pointer via the mouse 13 to the icon 33 and double-clicks on the icon 33. The electrical signals from the mouse 13 are processed by the mouse controller 29 and sent to the operating system 37 in RAM 24 via the system bus 21. The operating system 37 then checks, via the in-memory model 41, to see which application 38 is associated with the opened data file 39, usually by file type. The operating system 37 then executes the application 38 with the file name of the data file 39 passed on it as a parameter. The application 38 then opens the data file 39. The user may alternatively open the application 38 by double-clicking on the icon 35 and then calling the data file 38 by selecting the icon 33. MicroSoft Windows with DOS and IBM OS/2 with PM are examples of this type of operating system.

When the user elects to "move" a particular icon, he first positions the mouse pointer, via the mouse 13, over the icon to be moved; depresses and holds a first mouse button (either mouse button one or mouse button two) on mouse 13 or other first designated key action. The electrical signals from the mouse 13 are processed by the mouse controller 29 and are sent to the operating system 37 in RAM 24 as a low level event via the system bus 21. In response to the signals from the mouse controller 29, the operating system 37 may replace the mouse pointer with the icon of the being moved object, or otherwise modify the GUI in preparation for the "move" function. While the mouse button is actively held and while the icon of the being moved object, or mouse pointer, is repositioned by "dragging" the mouse 13, the operating system 37 monitors the location and coordinates of the mouse pointer on the computer display 14. As the icon of the being moved object, or mouse pointer, is dragged along a path to a selected target location on the computer display 14, the operating system 37 sends, via the second in-memory model 42, a "drag over" message to the window or folder over which the icon of the being moved object, or mouse pointer, is dragged. Recalling that the second in-memory model 42 contains coordinate information for various objects in the GUI, the second in-memory model 42 responds to the operating system 37 whether the being moved object is being "dragged over" an icon or whether the being dragged object is "dragged over" unoccupied space within the window or folder. Moreover, the second in-memory model 42 may provide a status condition to the operating system 37 for any icon which is being currently "dragged over". When referring to the "status condition" of for an icon, it is meant that an object, folder or window being "dragged over" may or may not be capable of accepting a being moved icon. Thus, the iconic representation of the being moved icon may vary in order to aid the user in assessing the "status" or availability of the object, folder, or window being "dragged over" for accepting the being moved icon. In the illustrative embodiment, the iconic representation of the object being dragged is modified so that the user could identify any one of several conditions for the object currently being "dragged over". When the mouse button is released, it is understood that the being dragged object is at the selected target. Accordingly, in order to complete the "move" operation, the coordinate information for the being dragged object in in-memory model 42 is updated with the coordinates associated with the selected target.

Figure 4A:
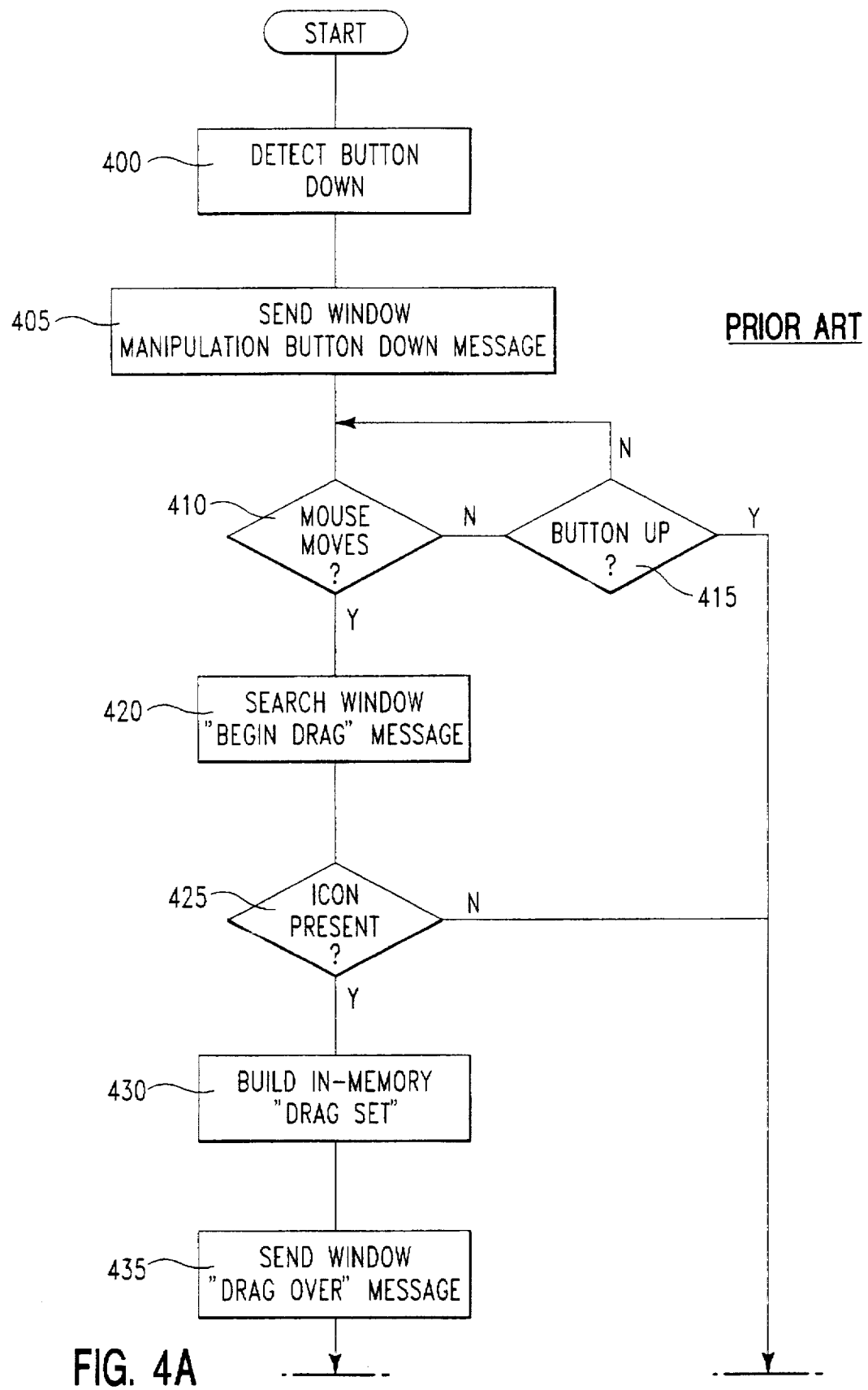
FIGS. 4a and 4b is a flow chart illustrating a prior art embodiment of a drag operation.
Figure 4B:
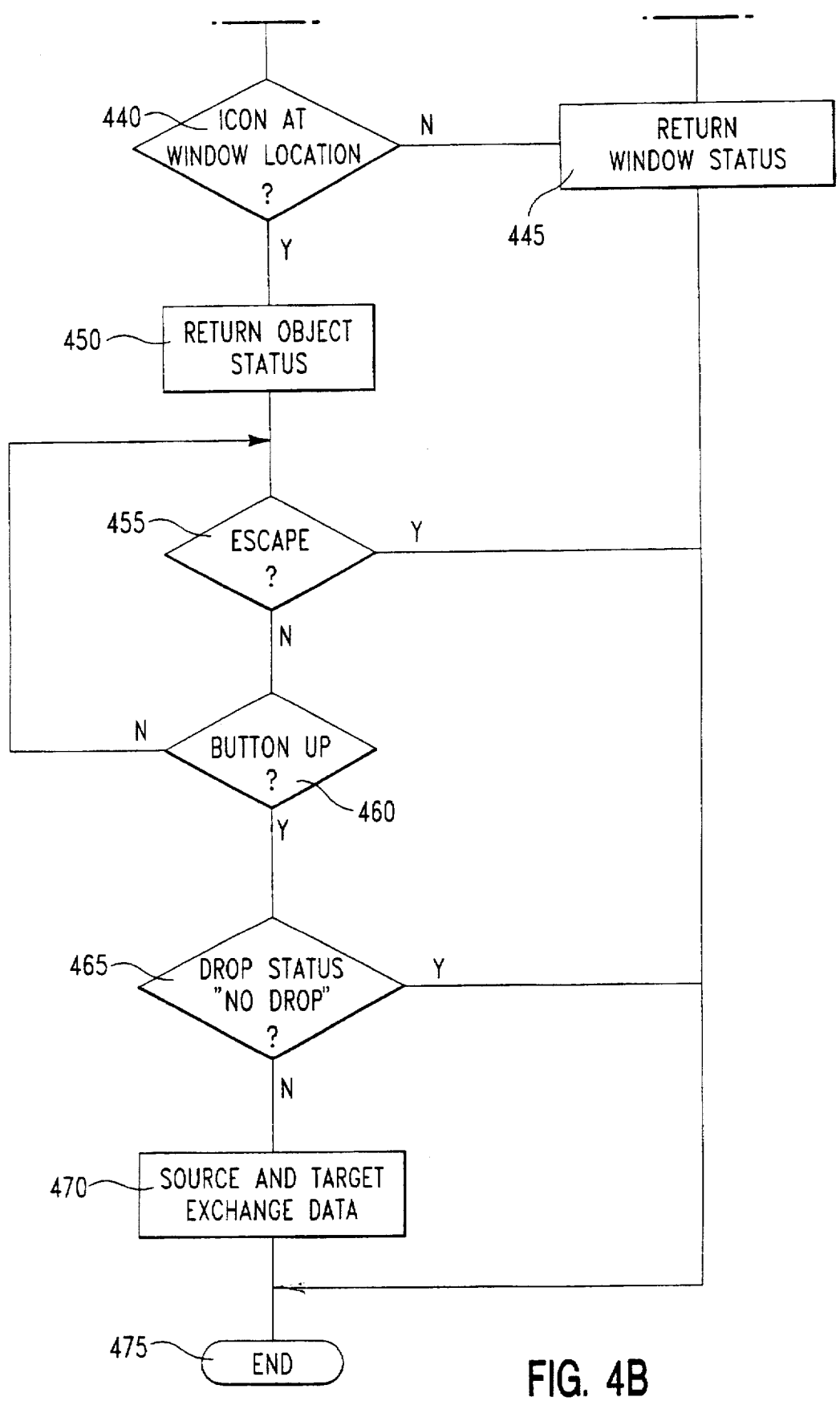

The flow diagram in FIG. 4 shows a prior art embodiment for the "move" function. In the flow diagram, the graphical conventions of a diamond for a test or decision and a rectangle for a process are observed. These conventions are well understood by programmers skilled in the art, and the flow diagram is sufficient to enable a programmer of ordinary skill to write code in any suitable computer programming language such as BASIC, Pascal or C for a computer, such as the IBM Personal Series (PS/2) family of computers which supports those languages.

In order to start operation, the operator activates the system 10 and causes to be displayed specific windows, folders and objects which are to be manipulated. The actions required are not detailed here as they have no relevance to this invention. Those skilled in the art will understand that the objects can be derived from a variety of sources, such as data files, applications, processes, physical devices, or folders comprising other objects. Similarly, the selected target can also be a data file, application, process, physical device, or folder comprising other objects.

Block 400 begins with operating system 37 detecting, from mouse 13 via mouse controller 29, that the first mouse button has been depressed. Continuing with block 405, the operating system 37 sends a "button down" message to the window below the mouse pointer at the time the mouse button is depressed at block 400. Having received the "button down" message, at decision block 410, operating system 37 waits for a signal, from the mouse controller 29, that the mouse 13 has moved before proceeding to block 420. If not, operating system 37 checks, at decision block 415, whether the mouse button has been released. If the mouse button has been released, the move function ends by branching to block 475. If the mouse button has not been released, the NO branch of decision block 415 serves as input to decision block 410. In so doing, the decision block 410–415 combination serves to allow the operating system 37 to wait until the mouse button is either moved or released before continuing with or exiting from the move function. Upon recognizing that mouse 13 has moved at decision block 410, operating system 37 sends a "begin drag" message to the window at the location of the mouse pointer, at block 420. Operating system 37 next, at decision block 425, checks whether an icon is present at the location of the mouse pointer. If no icon is present, the NO branch of decision block 425 branches to block 475 where the move function ends. Otherwise, the YES output of decision block 425 serves as input to block 430, where the window builds a "drag set" for the object represented by the icon recognized at block 425. If the selected object is a group of objects, all the objects from the selected set are added to the drag set. In the illustrative prior art embodiment, the selected icon is movably linked to the mouse pointer and moves either with the mouse pointer or in place of the mouse pointer. At block 435, while the user positions the mouse pointer with the drag set on it, operating system 37 sends the window under the mouse pointer a "drag over" message. The purpose of the "drag over" message is to determine whether there is an icon under the current position of the mouse pointer, as determined at decision block 440. If it is determined that no icon exists, the status of the window under the mouse pointer is determined at block 445. If determined that an icon does exist, the status of the icon under the mouse pointer is determined at block 450. In either case, the purpose of determining the status of the window or icon, is to ascertain whether the window or icon is capable of receiving the being moved object. At decision block 455, the operating system checks whether the user has elected to terminate the move function, before completing the move, by initiating an escape option. If elected, decision block 455 branches to block 475 where the move function is ended. Otherwise, decision block 455 serves as input to decision block 460 where the operating system monitors the condition of the mouse button. If the mouse button continues to be actively depressed, the NO branch of decision block 460 serves as input to decision block 455. In so doing, the decision block 455–460 combination "waits" for the user to either initiate an escape from the "move" function or continue with the "move" function by releasing the mouse button. Having recognized that the mouse button has been released, operating system 37 continues by checking the status, as determined in block 445 or 450, of the object or window under the mouse pointer at decision block 465. If the determined status is that of "no drop", or otherwise a condition preventing the being moved object from being moved or dropped, operating system 37 exists the move function at block 475. Otherwise, the "move" function is completed at block 470 where the source and target windows exchange data information by updating second in-memory model 42.

In an illustrative prior art embodiment, to "copy" an object the operator positions the mouse pointer to the object to be copied, presses and holds a second mouse button (that is, opposite that used for the "drag" operation), or other designated key action, and drags the being copied object to the other object (or other location on the computer display screen), release the mouse button when the object is over the desired location, and release the Ctrl key. As with the "move" function, the second in-memory model 42 provides that status of each "dragged over" object. When the mouse button is released, it is understood that the being copied object is at the selected target. Accordingly, as the being copied object is "dropped", new coordinate information for the being copied object is created in order to maintain the integrity of the coordinate information of the original location while adding the coordinate information of the selected target location.

In an illustrative prior art embodiment, to delete an object, the operator may move the mouse pointer to the object, press and hold mouse button 2, drag the object to a shredder object icon, and release the mouse button while the object to be deleted is over the shredder object icon. To print and object, the operator may move the mouse pointer to the object, press and hold mouse button 2, drag the object to a printer object icon, and release the mouse button while the object to be printed is over the printer object icon.

The "drag" operation, as described above in the "move", "copy", and "delete" functions, enables a user to manipulate a single object from a source location to a target location. A user may, however, opt to manipulate more than one object at a time. When the user elects to "drag" multiple objects, the user first moves the mouse pointer via the mouse 13 to the icon to be moved, as with the standard "drag" operation. The user then selects the object(s) to be dragged by initiating a designated key action while the mouse pointer is over the object(s) to be moved. The object(s) to be dragged are added to a "drag set" which comprise a comprehensive listing of the object(s) to be dragged. The "drag set" is a logical representation, physically residing in in-memory drag set model 44, of those objects selected by the user and to be dragged. Moreover, the attributes of the "drag set" are maintained by the folder or window in which its object members reside. It is to be understood that when dragging a single object, the "drag set" comprises one object member.

The operating system 37 further comprises a "source location" pointer, which points either to the single object, or the "drag set" of multiple objects, to be manipulated. To the extent that a "drag set" is limited to objects selectable from a single window or folder, in the illustrative prior art embodiments, multiple objects from only a single window or folder may be manipulated collectively as part of a single function.

In accordance with the present invention, a user may "lazy drag" an object or group of objects, in which graphically displayed images or icons may be moved to a selected location on the computer screen 16, without requiring the user to hold a button on mouse 13, or other switch, actively depressed during the move. Moreover, the present invention allows a user to "lazy drag" a group of objects from different folders or windows.

Figure 5A:
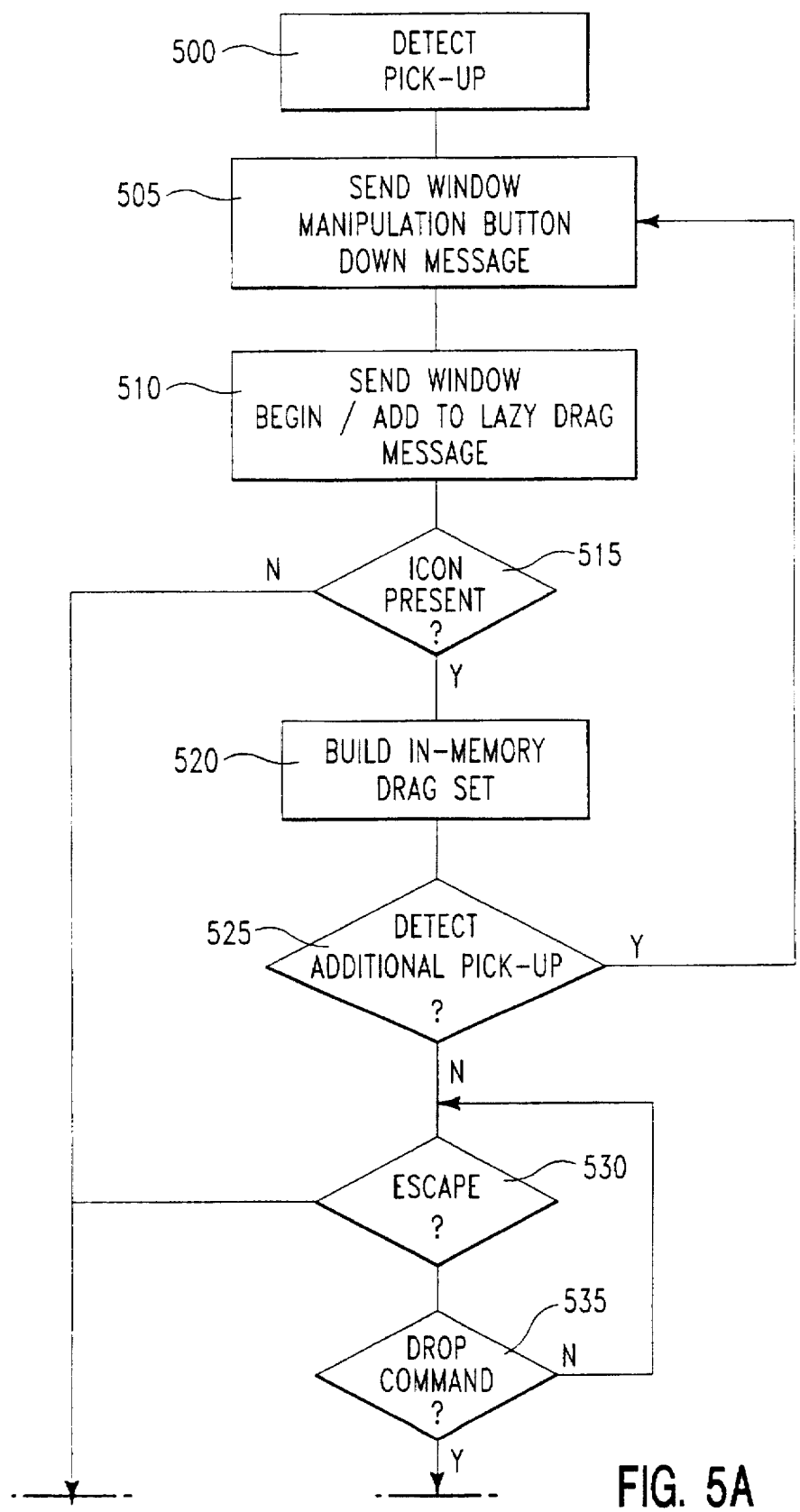
FIGS. 5a and 5b is a flow chart illustrating the lazy drag operation according to the present invention.
Figure 5B:
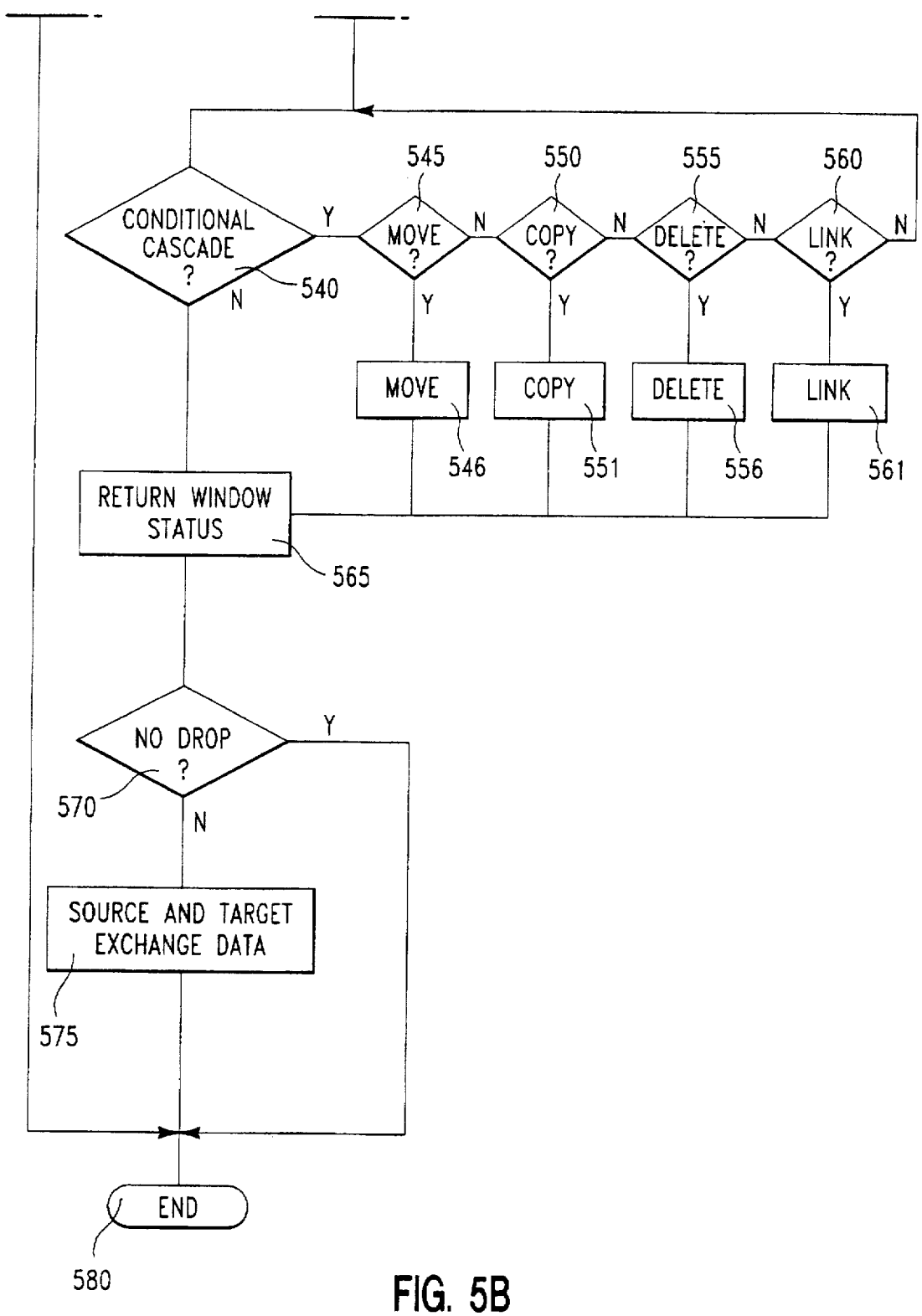

The flow diagram in FIG. 5 shows the operation of the invention. In the flow diagram, the graphical conventions of a diamond for a test or decision and a rectangle for a process or function are observed. These conventions are well understood by programmers skilled in the art, and the flow diagram is sufficient to enable a programmer of ordinary skill to write code in any suitable computer programming language such as BASIC, Pascal or C for a computer, such as the IBM Personal Series (PS/2) family of computers which supports those languages.

Block 500 begins with operating system 37 detecting, from mouse via mouse controller 29, that a "pick-up" command, or set of key strokes, has been initiated. In the illustrative embodiment, the pick-up is initiated either by pressing and releasing (i.e clicking) a first mouse button while at the same time holding down a lazy drag augmentation key, or by selecting the appropriate option from a pick-up menu option. In either case, the user is not required to hold any key actively depressed to proceed with the lazy drag operation. Continuing with block 505, operating system 37 sends a "manipulate" message to the window below the mouse pointer at the time the pick up command is initiated. Having received the "manipulate" message, operating system 37, at decision block 515, checks whether an icon is present at the location of the mouse pointer. If no icon is present, the NO branch of decision block 515 is taken to block 580 where the lazy drag function ends. Otherwise, the YES branch of decision block 515 serves as input to block 520, where the window builds an in-memory drag set 44 for the object represented by the icon recognized at decision block 515. Referring back to block 500, it is to be understood that more than one icon could be detected for a particular window or folder, and that a drag set 44 will comprise an entry for each icon detected within the particular window or folder. At decision block 525, operating system 37 detects whether the user has initiated an additional pick up command. If the user has, in fact, initiated such a command, the NO branch serves as input to block 505. Accordingly, the steps associated with blocks 505-525 are repeated in order to establish subsequent "drag sets" so long as the user continues selecting objects to be added to the "lazy drag" set. Referring again to block 520, operating system 37 links any subsequent drag sets which have been build subsequent to a first drag set during a first pass through block 520. In the illustrative embodiment, the contents of the source pointer of operating system 37 contains the address of the first drag set created during the "pass" through block 520. By linking subsequently created drag sets, only one source pointer in operating system 37 is required. An alternate embodiment may, for example, provide no linking between subsequently created drag sets and provide multiple source pointers, one for each drag set.

Continuing with decision block 530, operating system 37 checks whether the user has initiated an escape command or request. If operating system 37 has detected an escape command, the YES branch of decision block 530 branches to block 580 where the lazy drag function ends. Otherwise, the NO branch of decision block 530 serves as input to decision block 535 where operating system 37 checks for a "drop" command initiated by the user. In the event that a drop command has not yet been initiated, the NO branch of decision block 535 serves as input to block 530. In so doing, the block 530-535 combination "waits" for the user to either escape from or continue with the lazy drag function. At decision block 540, operating system 37 checks whether the user, having initiated a drop command at decision block 535, has requested options from a conditional cascade menu. If the user has requested conditional cascade options, the YES branch of decision block 540 is taken where, referring to blocks 545-561, operating system 37 checks for a user selectable cascade option. Among the selectable options, for example, are "move", "copy", "delete", or "link". These options are representative options in this, the illustrative embodiment. An abbreviated list of these, or other, options may be provided; or a more comprehensive list of options may be provided.

At block 565, a determination is made of the status of the window below the mouse pointer. Continuing with decision block 570, if a "no drop" status has been returned in block 565, the YES is taken to block 580 where the lazy drag function is ended. Otherwise, the lazy drag function is completed at block 575 where the lazy drag set information is exchanged with the target window by updating second in-memory model 42.

While the invention has been particularly shown and described with reference to one embodiment thereof, it will be understood by those skilled in the art that various changes in form and detail may be made without departing from the spirit and scope of the invention.

What is claimed is:

1. For a computer controlled display system having a graphical user interface, a computer display, graphically displayed objects, and drag sets, each said drag set comprising multiple said graphically displayed objects, are movably positioned on said computer display by actions of a user relative to said graphically displayed objects, an apparatus for allowing a user to perform a "lazy drag" operation, in which an image representing a composite one or more of said drag sets is moved to a selected target location on said computer display without requiring said user to hold any key or switch element of said computer system continually depressed in order to move the composite image to said selected target location, comprising:

display means for generating and displaying said graphically displayed objects on said display, a first of said graphically displayed objects displayed within a first area within a window displayed within said display, and a second of said graphically displayed objects displayed within a second area within said window, wherein said first area is not adjacent to said second area;

associating means for associating said first and said second of said selected graphically displayed objects into at least one drag set, wherein said drag set includes noncontiguous areas of said window;

coupling means for statically coupling one or more of said drag sets into a "lazy drag" set;

positioning means for selectively positioning a cursor at said selected target location on said display without altering the appearance or positions of the individual objects associated with said "lazy drag" set, without providing a visual graphical indication of a size of said "lazy drag" set, and without requiring said user to depress any key or switch element of said computer system in order to move said composite image to said selected target location; and releasing means for releasing said "lazy drag" set at said selected target location where said composite image has been positioned.

2. The apparatus as in claim 1 further comprising:
   means for deleting any of said graphical displayed objects from any of said drag sets.

3. The apparatus as in claim 1 further comprising:
   means for deleting any of said one or more drag sets from said "lazy drag" set.

4. The apparatus as in claim 1 further comprising:
   selecting means, associated with said one or more selected objects in said "lazy drag" set, for selecting between either a cut, copy, or link type operation only in response to releasing said "lazy drag" set utilizing said releasing means.

5. The apparatus as in claim 1 wherein said graphical displayed objects are displayed in one or more windows.

6. For a computer system having a computer display and a graphical user interface wherein graphically displayed objects are movably positioned on said computer display by actions of a user relative to displayed images of said objects, a method of enabling said user of said computer system to perform a "lazy drag" operation, in which an image representing a composite of one or more of said displayed objects is moved to a selected location on said computer display without requiring said user to depress any key or switch element of said computer system in order to move the composite image to said selected target location, said method comprising:

associating a first and a second selected displayed objects into at least one drag set, said first object displayed within a first area within a window displayed within said display, and said second object displayed within a second area within said window, wherein said first area is not adjacent to said second area;

statically linking one or more of said drag sets into a "lazy drag" set;

positioning a cursor at said target location on said display without altering the appearance or positions of the individual objects that are statically linked to said "lazy drag" set, and without providing a visual graphical indication of a size of said "lazy drag" set; and creating a statically fixed display of said composite image at said selected target location.

7. The method as in claim 6 further comprises:
   selecting between either a move, copy, cut, or link type of operation only after the step of positioning said cursor.

8. The method as in claim 7 further comprising:
   deleting said displayed objects after the step of selecting if a cut type of data tranfer operation has been selected.

9. For a computer controlled display system having a graphical user interface, a computer display, graphically displayed objects, and drag sets, each said drag set comprising one or more of said graphically displayed objects, are movably positioned on said computer display by actions of a user relative to said graphically displayed objects, an apparatus for allowing a user to perform a "lazy drag" operation, in which an image representing a composite one or more of said drag sets is moved to a selected target location on said computer display without requiring said user to hold any key or switch element of said computer system continually depressed in order to move the composite image to said selected target location, comprising:

- display means for generating and displaying said graphically displayed objects on said display;
- associating means for associating one or more selected graphically displayed objects into at least one drag set;
- coupling means for statically coupling one or more of said drag sets into a "lazy drag" set;
- positioning means for selectively positioning a cursor at said selected target location on said display without altering the appearance or positions of the individual objects associated with said "lazy drag" set, and without requiring said user to depress any key or switch element of said computer system in order to move said composite image to said selected target location;
- releasing means for releasing said "lazy drag" set at said selected target location where said composite image has been positioned; and
- selecting means, associated with said one or more selected objects in said "lazy drag" set, for selecting between either a cut, copy, or link type operation only in response to releasing said "lazy drag" set utilizing said releasing means.

10. The apparatus according to claim 9, further comprising means for deleting any of said graphically displayed objects from any of said drag sets.

11. The apparatus according to claim 9, further comprising means for deleting any of said one or more drag sets from said "lazy drag" set.

12. The apparatus according to claim 9, wherein said graphically displayed objects are displayed in one or more windows.

13. For a computer system having a computer display and a graphical user interface wherein graphically displayed objects are movably positioned on said computer display by actions of a user relative to displayed images of said objects, a method of enabling said user of said computer system to perform a "lazy drag" operation, in which an image representing a composite of one or more of said displayed objects is moved to a selected location on said computer display without requiring said user to depress any key or switch element of said computer system in order to move the composite image to said selected target location, said method comprising:

- associating one or more selected displayed objects into at least one drag set;
- statically linking one or more of said drag sets into a "lazy drag" set;
- positioning a cursor at said target location on said display without altering the appearance or positions of the individual objects that are statically linked to said "lazy drag" set;
- creating a statically fixed display of said composite image at said selected target location; and
- selecting between either a move, copy, cut, or link type of operation only after the step of positioning said cursor.

14. The method according to claim 13, further comprising deleting said displayed objects after the step of selecting if a cut type of data transfer has been selected.

* * * * *